United States Patent Office 3,357,832
Patented Dec. 12, 1967

3,357,832
WATER-SOLUBLE POLYTERTIARY AMINO COMPOUNDS FOR DECREASING THE VISCOSITY OF PHOTOGRAPHIC GELATIN-POLYMER SOLUTIONS
Marcel Nicolas Vrancken and August Jean Van Paesschen, Hove, and Jozef Frans Willems, Wilryjk-Antwerp, Belgium, assignors to Gevaert Photo-Producten, N.V., Mortsel, Belgium, a Belgian company
No Drawing. Filed May 4, 1964, Ser. No. 364,822
Claims priority, application Belgium, May 6, 1963, 42,606, Patent 631,905
4 Claims. (Cl. 96—94)

The present invention relates to a process for influencing the viscosity of gelatin-polymer solutions.

In the manufacture of photographic materials the combined use of gelatin and hydrophilic polymers may find all kinds of interesting applications. In this respect may be mentioned:

(a) The use of the combination of gelatin and hydrophilic polymers as binding agent for the purpose of influencing the physical properties of the layer, (b) The use of said combination in the preparation of emulsions obtained by a flocculation step, hereinafter called "flocculation emulsions."

For instance, according to the first application, a granular hydrophilic polymer obtained by acidifying a gelatin-polymer solution is incorporated into the backing layer of a photographic material. In this way a photographic material is obtained having a reduced tendency to curl before as well as after treatment in the photographic baths since the polymer dissolves in one of the photographic baths (Dutch patent application 282,075).

According to the second application, in the case of the so-called flocculation emulsions, certain hydrophilic polymers are added to an aqueous gelatin solution into which silver halides have been dispersed. When lowering the pH of the mixture to 5 or less, a complex consisting of hydrophilic polymer, gelatin and the silver halides present is flocculated. If necessary this flocculated complex may be washed. It redissolves in water when raising the pH and warming till 30–40° C. (British patent specification 884,840).

Known examples of hydrophilic polymers appropriate for the above purpose, are: poly(styrene sulfonic acid), poly(vinyl sulfonic acid) and a whole series of polymers and copolymers bearing carboxyl groups or sulfonic acid groups.

However, when aqueous solutions of the above hydrophilic polymers are added to aqueous solutions of gelatin, the mixture thus obtained shows a considerable increase in viscosity which is rather disadvantageous. This increase in viscosity is particularly considerable when the pH of the mixture is reduced to lower than 6–5 and said increase in viscosity remains even after washing and redissolving of the gelatin-polymer complex. Said increase in viscosity is the more considerable the higher is the molecular weight of the polymer and therefore poly(styrene sulfonic acids) with molecular weights under 30,000, preferably between 4000 and 5000, are favored.

On the other hand it is much more advantageous to use hydrophilic polymers with a molecular weight as high as possible since normally with a high molecular weight polymer a minor amount of polymer suffices for flocculating a larger amount of gelatin and silver salt.

Another reason in favor of the use of hydrophilic high molecular weight polymers is that commercially available polymers are normally high molecular weight products whereas the low molecular weight hydrophilic polymers have to be especially synthetized and hence are more expensive.

It has now been found that the increase in viscosity of gelatin solutions, containing hydrophilic polymers can easily be reduced or even be prevented.

The process according to the present invention for reducing the viscosity of gelatin solutions containing hydrophilic polymers is characterized thereby that to this solution of hydrophilic polymer and gelatin water-soluble compounds are added containing at least two tertiary amino groups and corresponding to one of the following formulae:

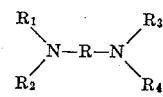

or

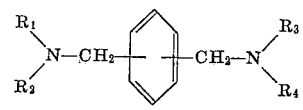

wherein:

each of $R_1$, $R_2$, $R_3$ and $R_4$ represents an alkyl group, and R represents an alkylene radical with straight or branched chain, in which some of the carbon atoms may be replaced by an alkyl- or dialkyl-substituted nitrogen atom.

Examples of water-soluble compounds containing at least two tertiary amino groups are among others:

(A) Alkylated polymethylene diamines

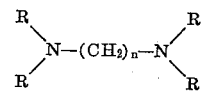

wherein:

R represents a methyl group, an ethyl group, a propyl group or a butyl group, and
$n$ is 1, 2, 3, 4, 5 or 6.

(B) Alkylated aliphatic diamines with branched chain

N,N'-tetramethyl-1-methyl-ethylene diamine

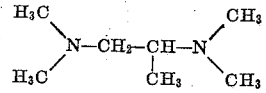

N,N'-dimethyl-bis(1-methylheptyl)-ethylene diamine

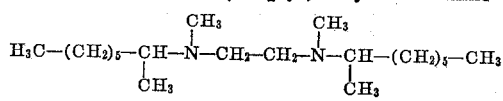

(C) Alkylated triamines

N,N',N''-pentamethyl-diethylene triamine

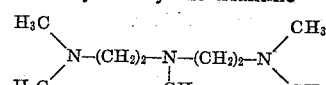

N,N',N''-pentamethyl-dipropylene triamine

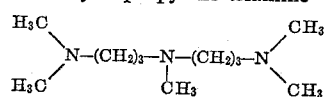

N,N',N'' - trimethyl - bis(1 - ethyl - 3 - methylpentyl)-diethylene triamine

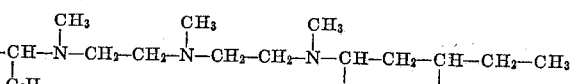

N,N',N''-pentamethyl dibutylene triamine

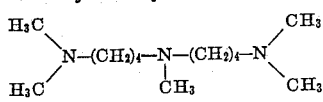

N,N',N''-pentamethyl diamylene triamine

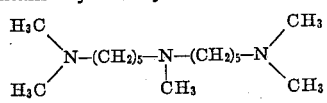

1,1,1-tri-(dimethylaminomethyl)-ethane

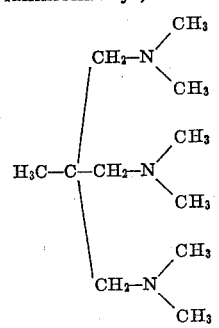

(D) Methylated tetra-amines and penta-amines

Hexamethyl triethylene tetramine

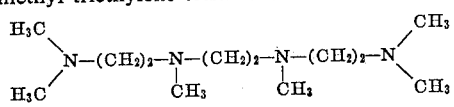

Tetraethylene heptamethyl pentamine

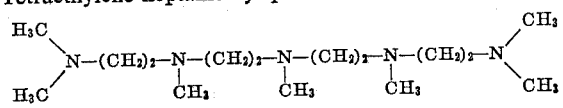

(E) Alkylated xylylene diamines

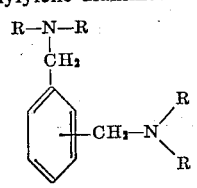

wherein R represents a methyl or ethyl group.

Example 1

To 3 l. of a 6% aqueous gelatin solution at 50° C., 1000 g. of potassium bromide and 25 g. of potassium iodide are added whilst stirring. After 15 minutes, 3 times a solution of 320 g. of silver nitrate in 1500 cc. of water is successively added with intervals of 10 min. The emulsion formed is cooled off to 32° C. and divided into 8 equal parts (tests A to H).

Parts A and E: the emulsions are brought at pH 5 by means of sulfuric acid; next, as much saturated aqueous sodium sulphate solution is added as to make the gelatin flocculate together with the silver halide.

Parts B, C and D: 50 cc. of a 10% aqueous solution of poly(styrenesulfonic acid) with molecular weight of 6,000 are added and the pH is brought to 4 by means of sulfuric acid. Hereby, a complex formed from poly(styrenesulfonic acid), gelatin and silver halide precipitates.

Parts F, G and H: 25 cc. of a 10% aqueous solution of poly(styrenesulfonic acid) with molecular weight of 40,000 are added and the pH is brought to 4 by means of sulfuric acid. Hereby, a complex precipitates from poly (styrenesulfonic acid), gelatin and silver halide as well.

Each of the 8 different parts is now separately washed 5 times with pure water. Hereafter, they are redissolved by heating up to 42° C. and increasing the pH up to 7 by means of sodium hydroxide. To parts C, D, G and H an amount (as determined in the following table) of 10% aqueous N,N'-tetramethyl-1-methylethylenediamine solution is added as anti-thickening agent. The viscosity of the 8 emulsion parts is measured at 42° C. The following results are attained.

|  | Amount of anti-thickening agent added, cc. | Viscosity in cp. |
|---|---|---|
| Parts: |  |  |
| A |  | 9 |
| B |  | 21 |
| C | 2 | 8 |
| D | 5 | 6 |
| E |  | 9 |
| F |  | 49 |
| G | 2 | 15 |
| H | 5 | 7 |

As appears from this table, the viscosity of the emulsion is considerably increased by poly(styrenesulfonic acid). The addition of antithickening agent causes a decrease of the viscosity.

Example 2

To a 7% aqueous gelatin solution, having at 42° C. a viscosity of 11.5 cp., as much 10% aqueous solution of poly(styrenesulfonic acid) with molecular weight 4,000 is added as to obtain 10% by weight of poly(styrenesulfonic acid) in respect of the gelatin.

Hereby, the viscosity of the solution is brought to 170 cp. at 42° C. This viscous gelatin solution is divided into a number of equal parts. Next, whilst strongly stirring, as much antithickening agent is added to each of these parts as to obtain each time 20, 10 or 5 parts by weight of antithickening agent in respect of the gelatin. The pH is each time adjusted at 6 and the viscosity measured at 42° C. The following results are attained:

| Antithickening agent | Percent by weight of antithickening agent in respect of gelatin | | |
|---|---|---|---|
|  | 20% | 10% | 5% |
|  | Viscosity in cp. at 42° C. | | |
| N,N'-tetramethylhexamethylene diamine | 13 | 15 | 24 |
| N,N'-tetraethylethylene-diamine | 16 | 21 | 48 |
| N,N'-tetramethylethylene-diamine |  | 54 | 96 |
| N,N'-tetramethyl-1-methylethylenediamine | 15 | 21 | 39 |

Example 3

To a 9% aqueous gelatin solution possessing at 42° C. a viscosity of 150 cp., 10% aqueous solutions of the following hydrophilic polymers are added:

A=poly(vinyltoluenesulfonic acid)

B=reaction product of poly(vinyl alcohol) and p-chlorosulfonylbenzoic acid in pyrindine at 80° C.

C=copoly(methacrylic acid/methyl methacrylate) (50:50).

As much of the 10% aqueous solutions of these hydrophilic polymer solutions is each time added, as to comprise 10% by weight of polymers in respect of the gelatin present. The viscosity of the obtained solutions is measured. Thereafter 10% by weight of N,N'-tetramethyl-1-methylethylenediamine are added as antithickening agent to each solution, whereupon the different viscosities are measured once again.

The results are given in the following table.

|  | pH | Viscosity in cp. at 42° C. | |
|---|---|---|---|
|  |  | Without anti-thickening agent | With anti-thickening agent |
| Polymer: |  |  |  |
| A | 6.0 | 49 | 20 |
| B | 6.0 | 175 | 24 |
| C | 4.5 | 58 | 22 |

We claim:
1. Process for decreasing the viscosity of aqueous gelatin solutions containing hydrophilic polymers comprising adding to said solutions while maintaining a pH of up to about pH 7 water-soluble compounds which contain at least two tertiary amino groups and which correspond to one of the following formulae:

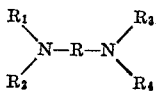

or

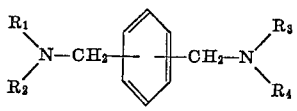

wherein:
each of $R_1$, $R_2$, $R_3$ and $R_4$ represents an alkyl group, and
R represents a member selected from the group consisting of a straight alkylene radical and a branched alkylene radical, wherein some of the carbon atoms may be replaced by a nitrogen atom substituted by a member selected from the group consisting of alkyl and dialkyl.

2. Process according to claim 1, wherein said hydrophilic polymer is poly(styrenesulfonic acid).
3. Process according to claim 1, wherein the aqueous gelatin solution is a photographic gelatino silver halide emulsion.
4. Process according to claim 1, wherein said water-soluble compounds are added in amounts comprised between 5 and 40% by weight relative to the weight of the gelatin present.

References Cited

UNITED STATES PATENTS

| | | | |
|---|---|---|---|
| 2,514,635 | 7/1950 | Gates et al. | 96—88 |
| 2,950,980 | 8/1960 | Hirsch | 100—125 |
| 2,956,880 | 10/1960 | Gates et al. | 96—94 |
| 2,960,405 | 11/1965 | Dersch | 96—94 |
| 3,017,280 | 1/1962 | Yudelson | 106—125 |
| 3,168,403 | 2/1965 | Himmelmann et al. | 96—114 |

NORMAN G. TORCHIN, *Primary Examiner.*

A. D. RICCI, C. E. DAVIS, *Assistant Examiners.*